(12) United States Patent
Spatz et al.

(10) Patent No.: US 9,938,442 B2
(45) Date of Patent: Apr. 10, 2018

(54) HYDROFLUOROCARBON/ TRIFLUOROIODOMETHANE/ HYDROCARBONS REFRIGERANT COMPOSITIONS

(75) Inventors: Mark W. Spatz, East Amherst, NY (US); Raymond H. Thomas, Pendleton, NY (US); Rajiv R. Singh, Getzville, NY (US); Samuel F. Yana Motta, East Amherst, NY (US); David P. Wilson, East Amherst, NY (US); Elizabet del Carmen Vera Becerra, Williamsville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 11/941,228

(22) Filed: Nov. 16, 2007

(65) Prior Publication Data
US 2009/0127497 A1    May 21, 2009

(51) Int. Cl.
C09K 5/04 (2006.01)
C10M 171/00 (2006.01)

(52) U.S. Cl.
CPC ......... C09K 5/045 (2013.01); C10M 171/008 (2013.01); C09K 2205/12 (2013.01); C09K 2205/122 (2013.01); C10M 2203/06 (2013.01); C10M 2203/10 (2013.01); C10N 2220/302 (2013.01); C10N 2240/30 (2013.01)

(58) Field of Classification Search
CPC ............... C09K 5/044; C09K 2205/22; C09K 2205/122
See application file for complete search history.

(56) References Cited

U.S. PATENT DOCUMENTS

| | | | |
|---|---|---|---|
| 2,004,006 A | 6/1935 | McKeon | 411/116 |
| 2,005,015 A | 6/1935 | Traudt | 68/184 |
| 5,611,210 A | 3/1997 | Nimitz et al. | 62/114 |
| 6,428,720 B1 | 8/2002 | Roberts | 252/67 |
| 6,695,973 B1 * | 2/2004 | Musso | C09K 3/30 252/67 |
| 7,083,743 B2 | 8/2006 | Krohnke et al. | 252/400.24 |
| 7,208,098 B2 | 4/2007 | Li et al. | 252/68 |
| 2003/0062508 A1 | 4/2003 | Singh et al. | 252/67 |
| 2005/0233934 A1 | 10/2005 | Singh et al. | 510/412 |
| 2006/0116310 A1 | 6/2006 | Singh et al. | 510/415 |

FOREIGN PATENT DOCUMENTS

| | | |
|---|---|---|
| EP | 1193305 A1 * | 4/2002 |
| WO | WO 94/20588 | 9/1994 |
| WO | WO 02/26913 A2 * | 4/2002 |
| WO | WO 2005/103189 | * 11/2005 |

* cited by examiner

Primary Examiner — John R Hardee
(74) Attorney, Agent, or Firm — Colleen D. Szuch

(57) ABSTRACT

A composition comprising from about 40 weight percent to about 99.9 weight percent of at least one $C_1$-$C_5$ hydrofluorocarbon, from about 0.1 weight percent to about 50 weight percent of CF3I, and from about 0.1 weight percent to about 10 weight percent of at least one $C_1$-$C_6$ hydrocarbon and the use of these composition for in methods of the recharging of refrigeration systems.

10 Claims, 3 Drawing Sheets

Oil Pump-Out Test

HYDROFLUOROCARBON/ TRIFLUOROIODOMETHANE/ HYDROCARBONS REFRIGERANT COMPOSITIONS

BACKGROUND OF THE INVENTION

Field of Invention

The invention relates generally to hydrofluorocarbon compositions. More particularly, the invention relates to blends of one or more hydrofluorocarbons, trifluoroiodomethane ($CF_3I$) and hydrocarbons, as well as methods for using these compositions in applications such as the recharging of refrigeration systems. and for its use in replacing a chlorofluorocarbon or hydrochlorofluorocarbon in a refrigeration system.

Description of the Related Art

Chlorofluorocarbons (CFCs) and hydrochlorofluorocarbons (HCFCs), such as dichlorofluoromethane (R-12), monochlorodifluoromethane (R-22), and azeotropic mixtures of monochlorodifluoromethane and chloropentafluoroethane (R-115) (known as R-502), have conventionally been used as refrigerants in heating and cooling systems. However, the use of chlorine-containing refrigerants, such as chlorofluorocarbons (CFC's), hydrochlorofluorocarbons (HCFC's) and the like, as refrigerants in air-conditioning and refrigeration systems has become disfavored because of the ozone-depleting properties associated with such compounds.

New compounds have been developed as alternatives to CFCs and HCFCs. Hydrofluorocarbons (HFCs) and hydrofluorocarbon blends are of particular interest as such alternatives because they have properties that are similar to chlorofluorocarbons, including similar refrigeration characteristics, i.e. a vapor pressure that is plus or minus 20 percent of the reference refrigerant at the same temperature, chemical stability, low toxicity, non-flammability, efficiency in-use and low temperature glides. Unlike CFCs and HCFCs, HFCs do not damage the ozone layer, and thus are considered environmentally friendly. Moreover, HFCs generally possess a good efficiency in-use which is important, for example, in air conditioning and refrigeration where a loss in refrigerant thermodynamic performance or energy efficiency may have secondary environmental impacts through increased fossil fuel usage arising from an increased demand for electrical energy.

Some HFCs are known to be exceptional refrigerants, including, but not limited to, difluoromethane (R-32), 1,1,1,2,2-pentafluoroethane (R-125), 1,1,1-trifluoroethane (R-143a), 1,1,1,2-tetrafluoroethane (R-134a), and 1,1-difluoroethane (R-152a). Certain blends of two or more of these HFCs can also be used to achieve particular thermodynamic properties. Common HFC blends include an azeotrope-like blend of R-143a and R-125 (known as R-507A), a non-azeotropic blend of R-125, R-143a, and R-134a (known as R-404A), a non-azeotropic blend of R-32 and R-125 (known as R-410A), and a non-azeotropic blend of R-32, R-125, and R-134a (known as R-407C). These alternative refrigerants are available commercially from various sources including Honeywell, DuPont, Atochem and ICI.

Each of these HFCs or HFC blends can serve as a replacement for one or more CFCs or HCFCs. For example, R-134a can serve as replacement of R-12 in refrigeration and air conditioning applications such as chillers; R-404A and R-507A can serve as replacements for R-502 in most refrigeration applications, including high, medium and low evaporation temperature systems; R410A can serve as replacement of R-22 in new air conditioning and refrigeration equipment: and R-407C can serve as a replacement for R-22 in various air-conditioning applications, as well as in most refrigeration systems including chillers. The use of chlorine-containing refrigerants, such as chlorofluorocarbons (CFC's), hydrochlorofluorocarbons (HCFC's) and the like, as refrigerants in air-conditioning and refrigeration systems has become disfavored because of the ozone-depleting properties associated with such compounds. As a result, it has become desirable to retrofit chlorine-containing refrigeration systems by replacing chlorine-containing refrigerants with non-chlorine-containing refrigerants that will not deplete the ozone layer, such as hydrofluorocarbons (HFC's). In order for replacement materials to be useful in connection with refrigeration compositions, the materials must be compatible with a lubricant utilized in the compressor.

However, widespread commercial use of these and other HFC refrigerants has been hindered by the lack of commercially adequate lubricants. Refrigeration system designers are interested in how the lubricant behaves in the system so that they can design piping and other components to best manage lubricant return to the compressor. The behavior of a refrigerant on a lubricant entering the system can affect film characteristics on heat transfer surfaces, and thus energy efficiency performance. Generally, the first property considered is miscibility of the lubricant with the liquid refrigerant. Unfortunately, many non-chlorine-containing refrigeration fluids, including HFC's, are relatively insoluble and/or immiscible in the types of lubricants used traditionally with CFC's and HFC's, including mineral oils. In order for a refrigeration fluid-mineral oil combination to work efficiently within a compression refrigeration, air-conditioning or heat pump system, the mineral oil must be sufficiently soluble in the refrigeration liquid over a wide range of operating temperatures. Such solubility lowers the viscosity of the mineral oil and allows it to flow more easily throughout the system. In the absence of such solubility, mineral oils tend to become lodged in the coils of the compression refrigeration, air-conditioning or heat pump system evaporator, as well as other parts of the system, and thus reduce the system efficiency. Fluorocarbon-based fluids have found widespread use in industry for refrigeration system applications, including air-conditioning systems and heat pump applications as well, all of which involve compression refrigeration.

The HFC refrigerants that are replacing HCFC refrigerants have a different influence on lubricants, which affects both compressor durability and system performance. Specifically, mineral oil or alkyl benzenes, which have been used with conventional refrigerants such as R-12, R-502 and R-22, are immiscible with HFCs and must therefore be replaced with polyol ester (POE) or other synthetic lubricants. However, major development considerations for the synthetic lubricants remain, including miscibility, solubility, stability, electrical properties, lubricity and retrofitting requirements.

Since HFC are generally immiscible in conventional lubricants, retrofitting refrigeration or air conditioning systems with HFC refrigerants typically requires the drainage of as much of the lubricant oil as possible before introducing the new refrigerants with synthetic lubricants. This process often involves removing the compressor from the system so that the lubricant can be adequately drained. For these and other reasons, it would be highly desirable to retrofit a CFC or HCFC system with HFC without having to remove the system's lubricant. By not needing to replace the existent oil, such a retrofit would become a simple "drop-in" operation. That is, the existent refrigerant would be replaced with a new refrigerant without any further change in, or disassembly of, the system hardware.

U.S. Pat. No. 5,611,210 teaches fluoroiodocarbon blends with an additive selected from the group consisting of: alcohols, esters, ethers, fluoroethers, hydrocarbons, hydrofluorocarbons, and perfluorocarbons with boiling points between −150° C. and +2000° C. U.S. Pat. No. 7,208,098 discloses a lubricating composition for compression refrigeration containing a blend of a polyol ester and an alkylbenzene, however, $CF_3I$ is not taught. U.S. patent application 20050233934 teaches azeotrope-like compositions comprising tetrafluoropropene and trifluoroiodomethane and uses thereof, including use in refrigerant compositions, and refrigeration systems. U.S. 2006/0116310A1, U.S. Pat. No. 7,083,743 and WO 94/20588 show combinations of halocarbons and fluoroiodocarbons. US2003/0062508A1, U.S. Pat. No. 2,004,006, U.S. Pat. No. 2,005,015 and U.S. Pat. No. 6,428,720 show combinations of halocarbons and hydrocarbons.

Accordingly, there exists a need and an opportunity to resolve this solubility problem so that the refrigeration industry may retrofit systems without costly and time-consuming flushing to entirely remove conventional lubricants. Applicants have discovered that the miscibility of HFCs in conventional lubricants can be greatly increased by blending the HFCs with $CF_3I$ (trifluoroiodomethane) and hydrocarbons (HC). It has been unexpectedly found that HFCs blended with $CF_3I$ and HCs are generally more miscible in common lubricant oils than blends of HFCs alone. By utilizing such HFC/$CF_3I$/HC blends, CFC or HCFC systems can be retrofitted without having to drain or replace the system's lubricants. In addition, it has been found that certain blends of HFCs, $CF_3I$ and HCs generally retain the thermodynamic properties that are important for refrigerants.

DESCRIPTION OF THE INVENTION

The invention provides a composition comprising (a) from about 40 weight percent to about 99.8 weight percent of at least one $C_1$-$C_5$ hydrofluorocarbon; (b) from about 0.1 weight percent to about 50 weight percent of $CF_3I$; and (c) from about 0.1 weight percent to about 10 weight percent of at least one $C_1$-$C_6$ hydrocarbon.

The invention further provides a method of recharging a refrigeration system comprising the steps of (a) providing a refrigeration system from which a chlorine-containing refrigerant has been substantially removed; and (b) introducing a composition comprising (a) from about 40 weight percent to about 99.8 weight percent of at least one $C_1$-$C_5$ hydrofluorocarbon; (b) from about 0.1 weight percent to about 50 weight percent of $CF_3I$; and (c) from about 0.1 weight percent to about 10 weight percent of at least one $C_1$-$C_6$ hydrocarbon into the system.

The invention also provides a method of recharging a refrigeration system comprising the steps of (a) providing a refrigeration system having at least one chlorine-containing refrigerant and at least one lubricant; substantially removing said chlorine-containing refrigerants while substantially retaining said lubricant; and (c) introducing a composition comprising (a) from about 40 weight percent to about 99.8 weight percent of at least one $C_1$-$C_5$ hydrofluorocarbon; (b) from about 0.1 weight percent to about 50 weight percent of $CF_3I$; and (c) from about 0.1 weight percent to about 10 weight percent of at least one $C_1$-$C_6$ hydrocarbon into the system.

Figure 1:
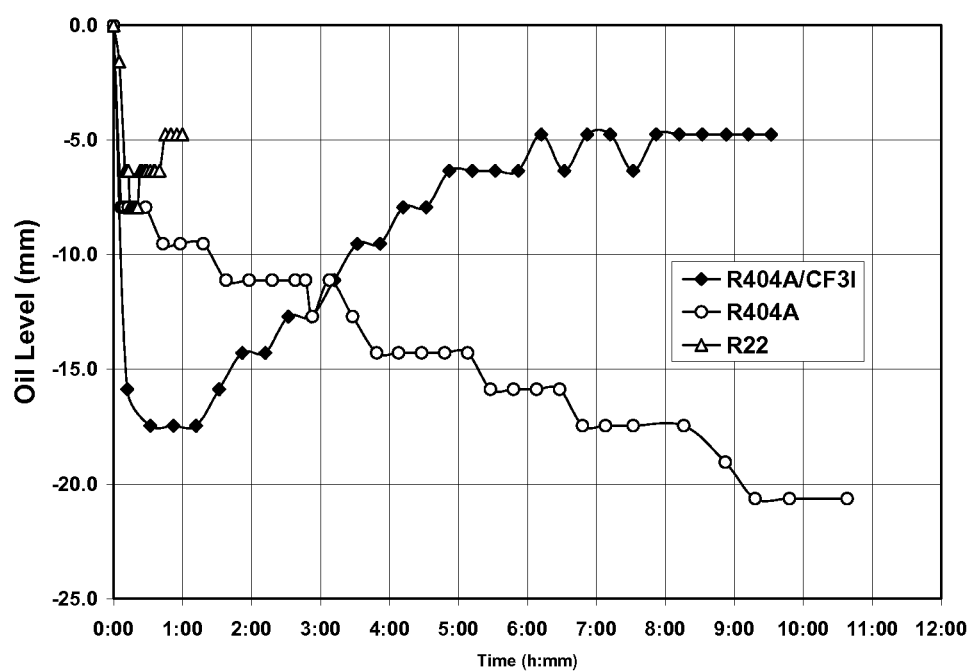
FIG. 1 is a plot of data from Example 1.

The present invention is directed to compositions comprising a hydrofluorocarbon, a hydrocarbon, and $CF_3I$ as a solubilizing agent, and the use of these compositions in applications such as the recharging of refrigeration systems. The compositions of the present invention may also be utilized as aerosol propellants, heat transfer media, gaseous dielectrics, fire-extinguishing agents, foam blowing agents, solvents, as well as in numerous other applications. As used herein, the term "solubilizing agent" refers to a substance that increases the solubility of one or more hydrofluorocarbons, one or more hydrocarbons, and one or more lubricants. In certain preferred embodiments of the invention, compositions are provided that comprise at least one HFC, at least one HC and an effective amount of $CF_3I$ as a solubilizing agent. As used herein, the term "effective amount" with respect to solubilizing agents refers to an amount of the $CF_3I$ solubilizing agent effective to dissolve a sufficient amount of the HFC and HC in a lubricant such that the diluted lubricant can be transported through the system back to a compressor.

The least one $C_1$-$C_5$ hydrofluorocarbon component comprises from about 40 weight percent to about 99.8 weight percent, preferably from about 72 weight percent to about 99.8 weight percent, and more preferably from about 85 weight percent to about 99.8 weight percent based on the weight of the overall composition. The $CF_3I$ component comprises from about 0.1 weight percent to about 50 weight percent, preferably from about 0.1 weight percent to about 20 weight percent, and more preferably from about 0.1 weight percent to about 10 weight percent based on the weight of the overall composition. The at least one $C_1$-$C_6$ hydrocarbon component comprises from about 0.1 weight percent to about 10 weight percent, preferably from about 0.1 weight percent to about 8 weight percent, and more preferably from about 0.1 weight percent to about 5 weight percent based on the weight of the overall composition.

Preferred HFCs for use with the present invention include, but are not limited to, $C_1$-$C_5$ hydrofluorocarbons and blends thereof. These include difluoromethane (R-32); 1,1,1,2,2-pentafluoroethane (HFC-125); 1,1,1-trifluoroethane (R-143A); 1,1,1,2-tetrafluoroethane (R134A); 1,1-difluoroethane (R-152A); and combinations thereof. Useful blends are commercially available as R-404A which is a blend of 1,1-difluoroethane (R-152A), 1,1,1,2-tetrafluoroethane (R134A) and 1,1,1-trifluoroethane (R-143A); R-507A which is a blend of 1,1,1,2-tetrafluoroethane (R134A) and 1,1,1,2,2-pentafluoroethane (HFC-125); R410A which is a blend of difluoromethane (R-32) and 1,1,1,2,2-pentafluoroethane (HFC-125); R-407C which is a blend of 1,1,1,2-tetrafluoroethane (R134A), 1,1,1,2,2-pentafluoroethane (HFC-125) and difluoromethane (R-32); R-407A which is a blend of difluoromethane (R-32), pentafluoroethane (HFC-125) and 1,1,1,2-tetrafluoroethane (R134A); and combinations thereof.

Useful hydrocarbons include wherein the at least one $C_1$-$C_6$ hydrocarbon comprises methane, ethane, propane, propene, propyne, cyclopropane, 2,2-dimethylpropane, butane, isobutane, 2-methylbutane, pentane, isopentane, 3-methylpentane, hexane, cyclohexane, isohexane, and combinations thereof.

The composition of the present invention are particularly miscible in lubricating oils such as mineral oil, hydrocarbon oil, alkyl oil, alkyl benzene oil, white or paraffinic oil, and mixtures thereof. Useful mineral oils include paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). The mineral oils useful for the present invention include those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins). Commercially available mineral oils include Witco LP 250® from Witco, Zerol 300® from Shrieve Chemical, Sunisco 3GS from Witco, and Calumet R015 from Calumet. Other useful mineral oils are commercially available as BVM 100 N (paraffinic mineral oil sold by BVA Oils), Suniso® 3GS (napthenic mineral oil sold by Crompton Co.), Sontex® 372LT (napthenic mineral oil sold by Pennzoil), Calumet® RO-30 (napthenic mineral oil sold by Calument Lubricants), Zerol® 75 and Zerol® 150 (linear alkylbenzenes sold by Shrieve Chemicals) and HAB 22 (branched alkylbenzene sold by Nippon Oil). The chemical compositions and uses of these oils are well known (see e.g. "Fluorocarbon Refrigerants Handbook" by Ralph C. Downing, Prentice Hall, 1998, pp. 206-270).

For systems utilizing an HFC and a lubricant, the lubricant and/or HFC may be added to the system as a mixture, provided that the HFC and lubricant are miscible with each other. Therefore, according to certain embodiments of the present invention, compositions are provided comprising an HFC/CF$_3$I/HC blend and at least one lubricant, wherein said lubricant is present in an amount of from about 0.1 to about 99.9 weight percent, and preferably from about 0.2 to about 90 weight percent, based on the total weight of the composition. The compositions of the present invention may further include any of a variety of optional additives including other lubricants, stabilizers, metal passivators, corrosion inhibitors, flammability suppressants, and the like.

EXAMPLES

The following non-limiting examples serve to illustrate the invention examples.

Example 1: Performance

This example demonstrates the thermodynamic properties of a HFC/CF$_3$I blend. Testing was performed in a refrigeration machine under typical operating conditions using a refrigerant test mixture and mineral oil (Nu-Calgon C-3 Refrigeration Oil). The test mixture composition was 89 wt. % of HFC(R404A) and 11 wt. % of CF3I. Testing was performed using a setup similar to the unit described in Report DOE/CE/23810-71 "Study of Lubricant Circulation in HVAC Systems," March 1995-April 1996 by Frank R. Biancardi et. al. (prepared for Air Conditioning and Refrigeration Technology Institute Under ARTI/MCLR Project No. 665-53100), which is incorporated herein by reference. In this case, a commercial refrigeration system equipment was employed using a commercially available condensing unit and an evaporator for a walk-in freezer/cooler. The following is a detailed description of the equipment:

The condensing unit was as manufactured by Keeprite Refrigeration, Brantford, Ontario Model K350L2 outdoor, air cooled, low temperature, R-22 condensing unit equipped with a 2DF-0300 Copeland compressor, a fin-and-tube coil, and a demand cooling system for low temperature operation. It also has a suction accumulator, an oil separator, a receiver, a two-valve head pressure control system, and other standard operating controls. The evaporator was as manufactured by Keeprite Refrigeration. A Model KUCB204DED electric defrost, low profile DX fed evaporator with electric defrost heaters and a Sporlan distributor and TXV. Capacity was rated as 17,340 BTUH@–20° F. SST, 10 degree TD, and 3,200 CFM air flow. The evaporator was installed in an environmentally controlled chamber that served as the walk-in freezer/cooler. The condenser unit was installed in another chamber to control temperature. Instrumentation was added to the system to measure refrigerant mass flow rate, refrigerant pressure and temperature before and after each component, air temperature and flow in/out of evaporator and condenser, and power to condensing unit and evaporator. Tests were run at two typical freezer temperatures (0° F.), and a range of ambient temperatures from 55° F. to 95° F. It should be noted that the refrigerant temperatures were typically 15° F. to 20° F. lower than the chamber temperatures. Table 1 shows performance results compared to R-22. R404A shows slightly higher capacity (Q) and lower efficiency (COP) as compared to R-22, but these values are expected due to their inherent thermodynamic properties. It is also showed a blend composed of 89% R404A and 11% of CF$_3$I by weight. For this case, both capacity and COP do not change significantly respect of pure R404A. Therefore, addition of CF$_3$I does not affect the system performance of an HFC-type fluid.

TABLE 1

| Test Results (Box temperature of 0° F.) | | | | | | | | |
|---|---|---|---|---|---|---|---|---|
| Outdoor | R22 | | R404A | | | R404A/CF3I | | |
| Temperature | Q | COP | Q | | COP | Q | | COP |
| (° F.) | Tons | — | BTU/h | Rel | — | Rel | BTU/h | Rel | — | Rel |
| 55 | 1.56 | 1.41 | 19791.7 | 105% | 1.374 | 97% | 19747.6 | 105% | 1.40 | 99% |
| 75 | 1.49 | 1.37 | 18767.2 | 105% | 1.288 | 94% | 17996.4 | 100% | 1.25 | 91% |
| 95 | 1.37 | 1.18 | 16308 | 100% | 1.047 | 89% | 15619.6 | 95% | 1.02 | 86% |

Example 2: "Oil Pump-Out" Tests

This example demonstrates that an HFC/CF$_3$I blend has better oil return properties in a refrigeration system as compared to R-404A without CF$_3$I. These tests utilized the same equipment as described in Example 1, with the following modifications: The oil separator located at the discharge of the compressor was by-passed, so the compressor oil level reflects actual oil movement to and from the system. The suction line was properly sized for this unit (1⅛").

An oil level was added to the compressor, so oil migration from and to the compressor could be tracked. A high-pressure piston pump was used to inject oil extracted from the compressor sump into the compressor discharge line. This gave us the ability to simulate oil pump out conditions as described in Biancardi's report. These tests consisted in injecting 375 cc of oil, previously extracted from the compressor pump, and observing the oil level. This type of test is known as a "pump-out" test and simulates oil leaving the compressor during the startup of a system, as described in Biancardi's report above. For reference, oil return tests were performed using refrigerant (R-22) and mineral oil which is a refrigerant/oil combination commonly found in the industry. Oil return was considered satisfactory when the oil level showed a recovery similar to the one recorded for R22. By recovering this amount, the compressor had enough oil to satisfy its lubrication needs and, thus, to extend compressor reliability. By observing the oil level in the compressor sump versus time (see plots of actual data in FIG. 1), it was observed that the final oil level with the test mixture is almost identical to the one obtained with R22, and significantly better than the one obtained with pure R-404A. This figure shows the oil level recorded with R404A never recovers. This example demonstrates that with the test mixture, the oil return in the system is enhanced over R-404A, the leading R-22 alternate refrigerant, without any significant effect on Capacity or COP (as showed in Table 1).

Example 3: Miscibility in a Liquid Receiver

Figure 2:
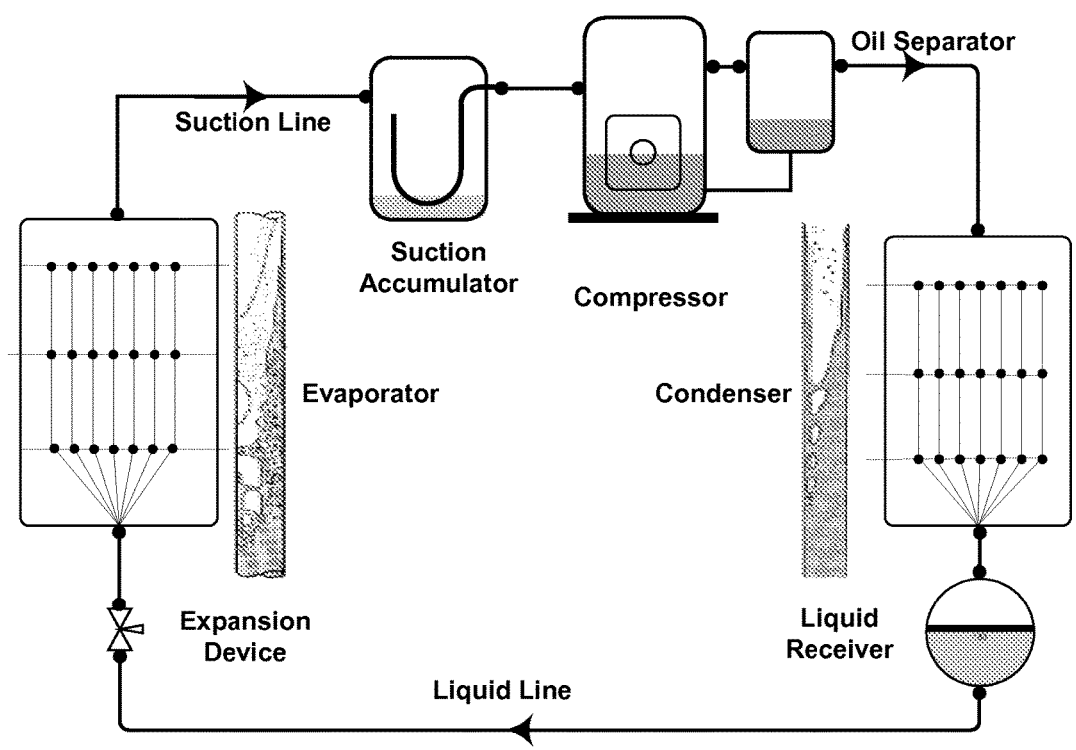
FIG. 2 is a representation of a typical commercial refrigeration system.
Figure 3:
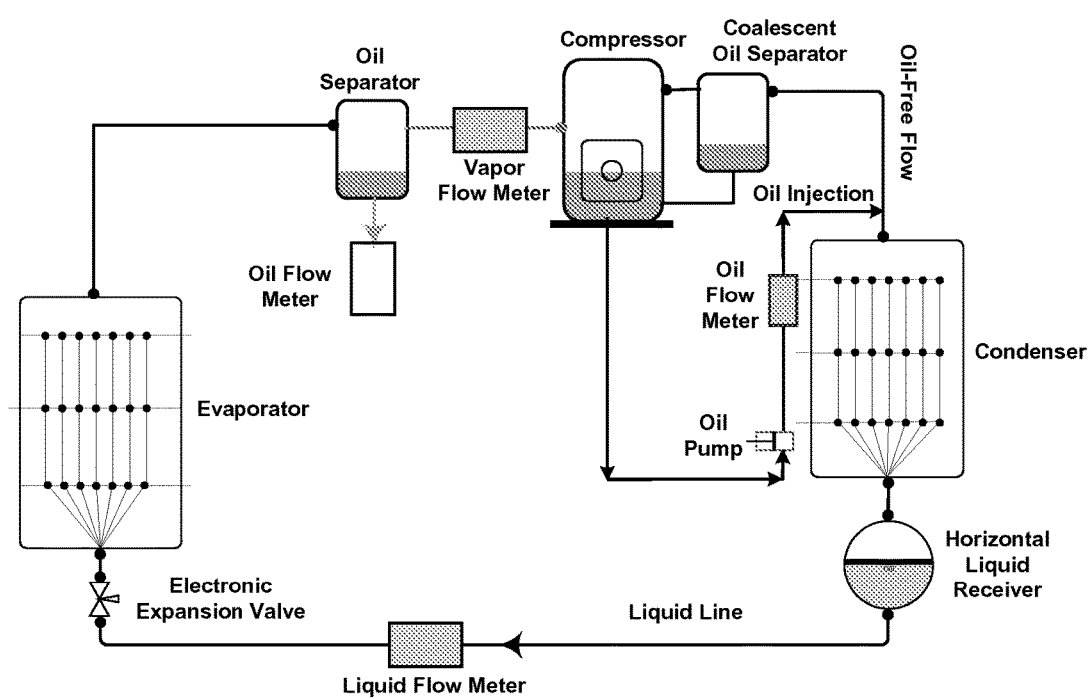
FIG. 3 illustrates an immiscible refrigerant/oil combination behavior in the liquid receiver.

FIG. 2 shows a typical commercial refrigeration system, which has suction accumulator and a liquid receiver after the condenser. Also shown in FIG. 3 is an immiscible refrigerant/oil combination behavior in the liquid receiver where a layer of oil would form on top of the liquid refrigerant due to its lower density. A test was developed to test solubilizing additives with two types of oils: mineral and alkylbenzenic. A liquid receiver was charged with approximately 3200 g of an HFC blend (R407C) and 39 g of oil. This blend as formulated is immiscible with oil floating on top of the liquid refrigerant as shown in FIG. 2. Next, a solubilizing additive was added until a single-phase was obtained. Table 2 shows the results obtained for two oils (MO and AB) and two additives (CF$_3$I and isobutane). It is demonstrated that 48.3% of CF$_3$I is needed to dissolve the mineral oil, and 38.3% is needed when AB oil is used.

TABLE 2

Miscibility Tests with a Liquid Receiver

| TEST | HFC | CF$_3$I | OIL AMOUNT |
|---|---|---|---|
| HFC/CF$_3$I with mineral oil | 51.70% | 48.30% | 0.63% |
| HFC/CF$_3$I with alkylbenzene oil | 61.70% | 38.30% | 0.69% |

Example 4: System Test with HFC/CF$_3$I/HC Blends

This example demonstrates that an HFC/CF$_3$I/HC blend has better oil return properties in the liquid receiver of a refrigeration system as compared to a pure HFC. The intent of this experiment is to take advantage of the good miscibility of hydrocarbons but limiting the flammability of the resulting blend by using CF$_3$I as both flammability suppressant and solubilizing additive. These tests used the same equipment as described in Example 1, with the following modifications: Two high-efficiency coalescent oil separators were added at the discharge of the compressor, so the stream after them was oil-free (below 50 ppm). A continuous oil injection system was designed to extract oil from the compressor sump and inject it at the inlet of the condenser, after the oil separators and before the liquid receiver (FIG. 3). This system comprises a high pressure oil pump, a metering valve and a mass flow meter, so we could impose a desired Oil Circulation Ratio (OCR), which is a relation by mass between oil and the total mass flow (refrigerant plus oil). Two sight glasses were added to the horizontal liquid receiver, so one can visually observe any oil accumulating or dissolving in the refrigerant. Oil circulation at the inlet of the liquid receiver was measured directly using the system and oil flow meters shown in FIG. 3. The OCR at the outlet of the receiver was measured using an oil separator at the outlet of the evaporator, which sends the vapor back to the system and the oil to flow meter. Verification measurements were done by sampling before and after the liquid receiver to measure directly the amount of oil passing through. These tests consisted of imposing an OCR of 0.40% (oil by mass) at the inlet of the liquid receiver and measuring it after. Table 3 shows results for two blends, which contain a constant fraction of isobutane (5% by mass) and two different contents of CF$_3$I. The first blend containing 5% of CF$_3$I and 5% of isobutane did not dissolve enough oil in the refrigerant as showed by the lower OCR at the outlet and a visual inspection through the sight glass (oil layer on top of the refrigerant). The second blend containing 18% of CF$_3$I and 5% of isobutane was successful in both mass balance and visual inspection (oil completely dissolved in the refrigerant).

TABLE 3

| Blends | OCR % | |
|---|---|---|
| | Inlet | Outlet |
| 90% HFC, 5% CF$_3$I, 5% isobutane | 0.40% | 0.38% |
| 77% HFC, 18% CF$_3$I, 5% isobutane | 0.40% | 0.40% |

Having thus described a few particular embodiments of the invention, various alterations, modifications, and improvements will readily occur to those skilled in the art. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A single phase composition consisting essentially of: (a) not less than about 40 weight percent of a blend comprising difluoromethane (R-32) and 1,1,1,2,2-pentafluoroethane (R-125); (b) from about 38.3 weight percent to about 48.3 weight percent of CF$_3$I; (c) optionally isobutane and/or n-butane; and (d) about 0.2% or greater of lubricant, wherein the composition is a single-phase composition.

2. The composition of claim 1 wherein said blend is non-azeotropic.

3. The composition of claim 2 wherein said lubricant is selected from mineral oil, hydrocarbon oil, alkyl oil, alkyl benzene oil, white or paraffinic oil, and mixtures thereof.

4. The composition of claim 2 wherein said lubricant comprises mineral oil.

5. The composition of claim 2 wherein said lubricant comprises alkyl benzene oil.

6. The composition of claim 1 wherein the isobutane and/or n-butane is present in an amount of from about 0.1 weight percent to about 8 weight percent.

7. The composition of claim 1 wherein the isobutane and/or n-butane is present in an amount of from about 0.1 weight percent to about 5 weight percent.

8. The composition of claim 1 wherein said lubricant comprises mineral oil.

9. The composition of claim 1 wherein said lubricant comprises alkyl benzene oil.

10. The composition of claim 1 wherein said lubricant is selected from mineral oil, hydrocarbon oil, alkyl oil, alkyl benzene oil, white or paraffinic oil, and mixtures thereof.

* * * * *